E. A. ASHCROFT.
TREATMENT OF COMPLEX ORES.
APPLICATION FILED APR. 9, 1910.
1,011,897.
Patented Dec. 19, 1911.
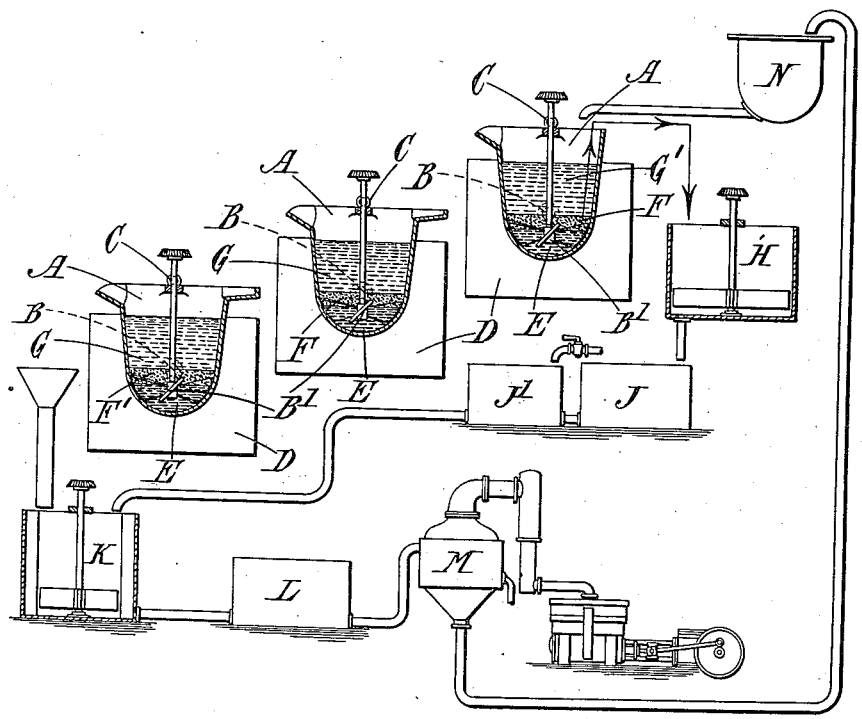

UNITED STATES PATENT OFFICE.

EDGAR ARTHUR ASHCROFT, OF SOGN, NORWAY.

TREATMENT OF COMPLEX ORES.

1,011,897.   Specification of Letters Patent.   Patented Dec. 19, 1911.

Application filed April 9, 1910. Serial No. 554,508.

*To all whom it may concern:*

Be it known that I, EDGAR ARTHUR ASHCROFT, subject of the King of England, residing at Sogn, Norway, have invented certain new and useful Improvements in the Treatment of Complex Ores, of which the following is a specification.

This invention relates to improvements in the metallurgy of lead-bearing zinc sulfids with or without small admixtures of other metals.

Sulfids of metals nearly free from gangue are produced in large quantities from the mechanical concentration of the well-known Broken Hill refractory ores which are taken here as sufficiently illustrative of similar ores which occur with slight modifications all over the world and are likewise amenable to the treatment herein described.

Two leading products from the concentrating mills are recognized in the arts to-day .viz. (*a*) zinc concentrates containing upward of 40% of zinc and under 12% lead and some silver, and (*b*) lead concentrates containing upward of 50% of lead and under 12% zinc and some silver. Also in smaller quantities (*c*) intermediate products such as slimes and middlings of varying composition. In treating (*a*) the process of zinc smelting in retort furnaces is the one generally employed and the lead, silver and sulfur are either lost or very imperfectly recovered from the residues at great expense. In treating (*b*) the process of lead smelting is now almost universally employed and the zinc and sulfur are lost. The intermediate products (*c*) are at present only capable of economical treatment by mixing with other smelting ores in a furnace in trifling quantities or by being first converted by mechanical separation into products resembling either (*a*) or (*b*) in composition.

The present invention has for its principal object the more economical treatment of the product (*a*) or the like. But products such as (*b*) or (*c*) may also be treated without departing from the invention.

Separation of lead and silver from the zinc sulfids and incidentally the enrichment of the latter in zinc and the removal of some of the remaining fine gangue from the coarser zinc sulfid residue so as to make a more economical smelting product are brought about by first treating the crude concentrate with a mixture containing fused chlorid of zinc, whereby the following reactions, some of which are already well known, take place.

(1). $PbS + ZnCl_2 = PbCl_2 + ZnS$
(2). $Ag_2S + ZnCl_2 = 2AgCl + ZnS$
(3). $Sb_2S_3 + 3ZnCl_2 = 2SbCl_3 + 3ZnS$
(4). $FeS + ZnCl_2 = FeCl_2 + ZnS$
(5). $MnS + ZnCl_2 = MnCl_2 + ZnS$

I have found that reactions 1, 2 and 3 are quantitative and complete if large molecular excess of zinc in relation to the other reacting metals is always present, not otherwise, while 4 and 5 occur only partially. The iron and manganese reactions can however be carried further by fine grinding of the ore if desired.

It has been suggested to make use of the above reactions 1 and 2, in the treatment of mixed lead, and zinc sulfid ores and recovery of the lead has been suggested by precipitating the lead with metallic zinc, which however is expensive and commercially impracticable, both on account of the high cost of the zinc and by reason of the contamination of the metals with iron which is unavoidable in that process. Also it has been suggested to recover the lead by leaching out the lead chlorid by treating the whole mass with water, but as can be readily shown by experiment these reactions go in inverse direction in aqueous solutions and the rapid re-formation of insoluble lead sulfid and sulfate prevents any efficient extraction of lead or silver by this method. It is also quite impracticable to electrolyze the whole molten mass for the recovery of lead by reason of the impurities and the large quantity of solid matter present which clogs the vat and prevents electrolytic action entirely. To overcome these difficulties while making use of the known reactions I have invented the following process, the essential features of which are that:—The mixed ore or concentrate is first treated for the extraction of lead and other metals by leaching and washing it with fused chlorid of zinc so as to precipitate zinc sulfid and dissolve lead and other metals and melt is poured off from the residue so that the most of the zinc sulfid is separated, and the lead salt is at once removed and obtained separately. The operation is best performed in two or more stages, preferably in cascade, the fused melt passing in one direction (downward) and the solid residue together with a little of the fused melt it mechanically retains, being moved in the other direction (upward) preferably by moving the receptacles as described below. The residue ultimately removed is washed rapidly with hot water to remove soluble chlorids such as zinc and lead chlorids therefrom.

This invention permits of several alternative methods of treating the melt for the lead and other metals and the regeneration of the fused zinc chlorid. In one method the separated melt containing zinc chlorid and other chlorids such as lead chlorid and containing also some finely divided zinc sulfid in suspension is introduced into water with or without the addition of an acid in small quantities (such as HCL or $H_2SO_4$) so that the zinc sulfid and lead chlorid react so as to precipitate lead (in the form of sulfid or sulfate) and render the zinc soluble as chlorid, or the lead chlorid may be separated readily by crystallization from the slightly acidified and concentrated solution of zinc chlorid and treated separately in the same manner using the finely divided zinc sulfid also recovered by a further settling from the melt. The latter method has the advantage of carrying on the operation with a greatly reduced bulk of materials. In either case conveniently the lead chlorid washed from the coarse zinc sulfid residue is added to the solution of the melt while the finely divided zinc sulfid precipitated by reactions 1 to 5 is allowed to remain suspended in the poured melt. This presents no difficulty in practice as it settles more slowly than the coarse natural zinc sulfid of the ore. The quantity of zinc sulfid in suspension thus being proportional to the total quantity of lead chlorid present will form zinc chlorid and precipitate the insoluble lead salts in molecular proportions.

In an alternative method the separated melt containing zinc chlorid and other chlorids such as lead chlorid with or without finely divided zinc sulfid in suspension is electrolyzed for the production of either (a) the sulfur and metal, (b) chlorid of sulfur and metal or (c) chlorin and metal. In the process according to (b) or (c) the produced chlorin or chlorid of sulfur may be caused to react with zinc sulfid for the regeneration of zinc chlorid. In any case the zinc chlorid may be evaporated, brought to fusion and used again the lead and silver are recovered as metals and the operations of the process are cyclic.

It is a feature of this invention that the main operation may take place over a bath of molten lead so that any silver contained in the original mixture will be precipitated therein. Further, it is preferred to add the fused zinc chlorid in considerable excess and preferably in the form of a mixture of chlorid of zinc and sodium.

The accompanying drawing is a diagram illustrating one method of carrying the invention into effect.

In the arrangement illustrated the treatment is carried out at a temperature which should be under 500° C. in stirring pans or large kettles A mounted on trunnions B and provided with an agitating apparatus $B^1$, which can preferably be lifted out of the pot also with means such as loops C for enabling the pots to be raised and moved by cranes. Each pot is provided with a furnace D. In each pot is a small quantity of molten lead E which will react with the silver chlorid forming an alloy of silver and lead thus extracting all the silver from the melt in rich alloy which can be readily cupelled

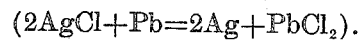
$$(2AgCl + Pb = 2Ag + PbCl_2).$$

The ore is introduced into the lowest vessel as at $F^1$ and the vessels are successively moved upward after a suitable period of treatment. The fused zinc chlorid is introduced into the upper vessel as at $G^1$ and the fused mixed chlorids after the reaction has taken place in the uppermost vessel is poured into the second vessel and subsequently into the lowest vessel. There are in each vessel three layers: the molten lead E at the bottom, the ore or solid residue $F^1$ or F consisting of zinc sulfid above the molten lead, and the fused melt G or $G^1$ consisting of zinc chlorid having in solution chlorids of the other metals above the ore and also permeating it. The molten mixture of zinc and sodium chlorid contains a large proportion of sodium chlorid and thus has a low specific gravity; the lead chlorid as formed dissolves in this mass, but as its percentage is relatively small the increase in specific gravity of the resultant mixture is low, hence the melt floats on the ore. When the melt has been poured off from the topmost vessel the fused lead (containing silver) is run off to a store-pot where it can be drawn off for use again or taken to the cupelling apparatus. The residue consisting chiefly of heavy coarse zinc sulfid with a small quantity of lead chlorid and other chlorids and some zinc chlorid occluded is balled up (by allowing it to cool to about 250° C. and stirring the just setting mass) and introduced into an agitation vessel H with hot water, which causes the immediate disintegration of the mass and the solution of the soluble chlorids. The emulsion is passed to a leaching vat or filter J (from which the solution of chlorids may be removed to another vessel $J^1$ to crystallize out the lead chlorid). The melt from the last vessel may be poured direct into a small quantity of water in an agitation vessel K from which the whole contents are discharged into a leaching vat or filter L where the lead sulfid or sulfate or other solid residue formed is removed from the zinc chlorid solution. The resulting zinc chlorid solution is then introduced into a vacuum pan M and the evaporated zinc chlorid is subsequently fused in a fusing pot N and re-introduced into the uppermost vat A.

If antimony or arsenic or both are present the volatile chlorids of these metals formed by reaction 3, will instantly distil (at 200° C.) from the melt and when these chlorids have to be collected the kettle is provided with a hood and condenser. The recovered antimony chlorid can be treated with zinc oxid for the regeneration of zinc chlorid forming antimony oxid which latter is easily smelted to metal antimony.

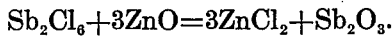

In the above treatment it is convenient to employ instead of zinc chlorid alone a mixture of zinc and sodium chlorids in molecular proportions corresponding to the formula $ZnNaCl_3$ this mixture being more stable when melted than pure $ZnCl_2$. The double salts of zinc and sodium (especially $ZnNa_2Cl_4$) also readily crystallize out from solutions of the chlorids in water and so cheapen the evaporation necessary for the recovery of that part of the zinc chlorid which has to be dissolved in water.

In this process there must be always used enough zinc chlorid in each melt to react with all the lead sulfid present and a considerable excess in order to form a fluid mass of supernatent liquor above the residue, a convenient quantity in this case will be two tons of the mixed sodium and zinc chlorids to each ton of concentrates which is a great excess molecularly but makes a freely fluid mixture of suitable bulk for the above-described pouring off (or fused leaching) and washing process.

After the above preliminary treatment the residue as above described is extracted as rapidly as possible in a little water which takes all the zinc, iron and manganese chlorids which have been formed by reactions 1 to 5 and any remaining lead or silver chlorid. It may be afterward more thoroughly washed with hot brine solution followed by a little fresh boiling wash water if desired. Any silver not previously extracted by the fused lead bath may be recovered from the solutions. These operations may be performed in a filter press or leaching tank and the leaching medium may be used repeatedly with intermittent heating and cooling taking up lead chlorid when hot and depositing it in crystalline form when cold. The remnant of zinc chlorid recovered in this operation is brought to the fused state again by evaporation.

The alternative final step in this process is to electrolyze the supernatent liquor containing the zinc and the lead chlorid from the solutions, to which may be added the produced lead chlorid after collecting and drying. For this purpose either of three alternative methods may be employed, viz: (1) Simple electrolysis of $PbCl_2$ whereby Pb and $Cl_2$ are produced and the chlorin is afterward used for the decomposition of a further quantity of zinc sulfid according to the method described in Swinburne and Ashcroft's British Patent No. 14278 of 1899 whereby the required zinc chlorid is produced to supply that consumed in the above process. Or (2) The lead chlorid is electrolyzed in the presence of a small quantity of suspended zinc sulfid at a low temperature according to my patent whereby metallic lead and chlorid of sulfur are produced and the sulfur chlorid is afterward reacted with zinc sulfid according to the method described in Swinburne and Ashcroft's British Patent No. 17612 of 1900 whereby the required zinc chlorid is produced and the sulfur recovered. Or (3) The fused melt or recovered lead chlorid is mixed in molecular proportions with the purest available form of zinc sulfid and electrolyzed at a high temperature in a bath of any suitable fused salt. By this means the lead is recovered as metal, the sulfur (in molecular proportion) is recovered as brimstone and the zinc chlorid used in the first step of the process is regenerated (see British patent Swinburne No. 10829ᵃ of 1897). To provide the zinc sulfid for this purpose (2 and 3) a further quantity of the original zinc concentrates or a proportion of the finished (lead and silver free) zinc concentrates may be set aside. If this portion contains lead sulfid the latter merely dissolves in the melt and may be electrolyzed to lead and sulfur (or chlorin or sulfur chlorid) directly and economically so that lead sulfid is no detriment but an advantage as an impurity but it is desirable in such case to first extract the silver content in a separate vessel by means of lead so as to avoid loss in the larger bulk of lead constituting the cathodes in the main electrolysis plant. The finely divided ZnS formed by reaction (1) may also be readily floated or washed from its heavier associated matter and used for this purpose. The electrolysis in either case may be caused to take place between carbon anodes and cathodes of molten lead in any suitable apparatus, with or without agitation of the contents of the cell. This electrolysis when sulfids are present in the baths is extremely economical of energy and of apparatus, as the heat energy of formation of $ZnCl_2$ from ZnS and $Cl_2$ is deducted from the total energy required for separating the lead from $PbCl_2$. Therefore the sum of the theoretical energy of the whole process is only that of the decomposition of PbS and corresponds to about 4 volts. Some extra voltage will of course be required to heat the bath but it is quite practical to work the apparatus at two volts per cell with a very high current density which may be roughly stated at 500–1000 amps. per square foot of anode surface. Means of agitating this bath may be provided either mechanically or preferably by magnetic influence as described in my Patent (No. 12083/1903). This is more especially required when the SpG of the mixture employed is low.

As an instance of the working of this invention I quote the following actual results from my experiments. An ore assaying Zn 40.2% Pb 10.6% Fe 8.5% insol. and gangue 9% S. 22.0% Ag 16.7 ounces per ton was worked upon. A solid residue of unchanged zinc sulfid was obtained weighing when washed and dried 78% to 82% (average of numerous tests) which assayed Zn 50.6% Pb 0% to 1% Fe 8.0% insol. 8.5% Ag .25 ounces per ton. The lead bath contained nearly all the silver of the original ore the actual content depending on the quantity of ore which had been used. In the second stage of the process metallic lead quite pure, and chlorin gas, were obtained (or chlorid of sulfur) by electrolysis of the produced lead chlorid (both with and without admixture of zinc sulfid) and the chlorin (or chlorid of sulfur) were afterward caused to react with more zinc sulfid concentrate producing the equivalent of zinc chlorid. When electrolysis was not employed the melt being dissolved in water with suspended zinc sulfid present, there was produced in the insoluble residue obtained from the zinc chlorid solution a lead concentrate containing all the original lead of the ore treated and some of the finer gangue and assaying about 50% fine insoluble gangue and 50% of lead sulfid or sulfate (average of various tests). Thus all the zinc of the original ore is accounted for in the first residue and all the lead in the second and separate residue. The zinc contained in the zinc chlorid is recovered again in the original form and the silver content of the ore is incidentally separated and recovered in separate alloy with the metallic lead bath. The recovery of these metals together with the improvement of the qualities of the zinc sulfid residue either for zinc smelting or for chlorin smelting with electrolysis (according to my application Serial No. 554,510) constitute a valuable and important improvement in the metallurgy of these ores or products.

It will be manifest that the zinc chlorid in this process is not used up, the stock of combined chlorin being permanent except for small losses brought about by impurities.

Some iron and manganese will be carried into the working stock of zinc chlorid by the incompleteness of the above reactions Nos. 4 and 5 but these reactions are found to take place to a very limited extent, the bulk of the iron and manganese remaining with the zinc sulfid residues. Likewise any silicious gangue matter introduced with the sulfids into the electrolytic vat may be separated by washing from the $ZnCl_2$ final product of electrolysis. These impurities may be removed periodically at suitable intervals by ordinary settling and purification methods.

I do not confine myself to the precise details of working and application of this process as given herein and I do not claim as novel all the above described reactions and operations.

What I claim as my invention and desire to secure by Letters Patent is:—

1. The herein described process of separating metals from zinc sulfid containing other metallic sulfids which consists in the reaction of zinc chlorid with said metallic sulfids in the fused state to precipitate zinc sulfid and dissolve the other metals, pouring off the liquid melt consisting of zinc chlorid having in solution chlorids of the other metals from the solid residue to separate the melt from the residual zinc sulfid, and thereafter treating the melt to recover the metals therefrom.

2. The herein described process of separating metals from zinc sulfid containing other metallic sulfids which consists in the reaction of zinc chlorid with said metallic sulfids in the fused state to precipitate zinc sulfid and dissolve the other metals, pouring off the melt from the residue to separate the liquid melt consisting of zinc chlorid having in solution chlorids of the other metals from the solid residual zinc sulfid, thereafter treating the melt to recover the metals therefrom, and performing the separation in two or more stages in cascade, the fused melt passing in one direction and the solid residue being moved in the other direction.

3. The herein described process of separating metals from zinc sulfid containing other metallic sulfids which consists in the reaction of zinc chlorid with said metallic sulfids in the fused state to precipitate zinc sulfid and dissolve the other metals, pouring off the melt from the residue to separate the liquid melt consisting of zinc chlorid having in solution chlorids of the other metals from the solid residual zinc sulfid, thereafter treating the melt to recover the metals therefrom, performing the separation in two or more stages in cascade the fused melt passing in one direction and the solid residue being moved in the other direction, washing rapidly the residue with hot water to remove soluble chlorids such as zinc and other metal chlorids therefrom, and adding the solution of chlorids to the melt.

4. The herein described process of separating metals from zinc sulfid containing other metallic sulfids which consists in the reaction of zinc chlorid with said metallic sulfids in the fused state to precipitate zinc sulfid and dissolve the other metals, pouring off the melt from the residue to separate the liquid melt consisting of zinc chlorid having in solution chlorids of the other metals from the solid residual zinc sulfid, thereafter treating the melt to recover the metals therefrom, performing the separation in two or more stages in cascade the fused melt passing in one direction and the solid residue being moved in the other direction, washing rapidly the residue with hot water to remove soluble chlorids such as zinc and other metal chlorids therefrom, adding the solution of chlorids to the melt, and introducing into water the separated melt containing zinc and other metal chlorids and also some finely divided zinc sulfid in suspension, so that the zinc sulfid and other metal chlorids react to precipitate the metal compounds other than the zinc.

5. The herein described process of separating metals from zinc sulfid containing other metallic sulfids which consists in the reaction of zinc chlorid with said metallic sulfids in the fused state to precipitate zinc sulfid and dissolve the other metals, pouring off the liquid melt consisting of zinc chlorid having in solution chlorids of the other metals from the solid residue to separate the melt from the residual zinc sulfid, thereafter treating the melt to recover the metals therefrom, performing the separation in two or more stages in cascade the fused melt passing in one direction, and the solid residue being moved in the other direction, washing rapidly the residue with hot water to remove soluble chlorids such as zinc and other metal chlorids therefrom, adding the solution of chlorids to the melt, and introducing into water with the addition of acid the separated melt containing zinc and other metal chlorids and also some finely divided zinc sulfid in suspension, so that the zinc sulfid and other metal chlorids react to precipitate the metal compounds other than the zinc.

6. The herein described process of separating metals from zinc sulfid containing other metallic sulfids which consists in the reaction of zinc chlorid with said metallic sulfids in the fused state to precipitate zinc sulfid and dissolve the other metals, pouring off the liquid melt consisting of zinc chlorid having in solution chlorids of the other metals from the solid residue to separate the melt from the residual zinc sulfid, thereafter treating the melt to recover the metals therefrom, performing the separation in two or more stages in cascade the fused melt passing in one direction and the solid residue being moved in the other direction, and in adding the fused zinc chlorid in considerable excess in the form of a mixture of chlorid of zinc and chlorid of sodium.

7. The herein described process of separating lead and other metals from zinc sulfid containing lead and other metallic sulfids which consists in the reaction of zinc chlorid with said metallic sulfids in the fused state to precipitate zinc sulfid and dissolve lead and other metals, pouring off the melt from the residue to separate the liquid melt consisting of zinc chlorid having in solution chlorids of the other metals from the solid residual zinc sulfid, and thereafter treating the melt to recover the metals therefrom.

8. The herein described process of separating lead and other metals from zinc sulfid containing lead and other metallic sulfids which consists in the reaction of zinc chlorid with said metallic sulfids in the fused state to precipitate zinc sulfid and dissolve lead and other metals, pouring off the melt from the residue to separate the liquid melt consisting of zinc chlorid having in solution chlorids of the other metals from the solid residual zinc sulfid, thereafter treating the melt to recover the metals therefrom, and in performing the separation in two or more stages in cascade the fused melt passing in one direction and the solid residue being moved in the other direction.

9. The herein described process of separating lead and other metals from zinc sulfid containing lead and other metallic sulfids which consists in the reaction of zinc chlorid with said metallic sulfids in the fused state to precipitate zinc sulfid and dissolve lead and other metals, pouring off the melt from the residue to separate the liquid melt consisting of zinc chlorid having in solution chlorids of the other metals from the solid residual zinc sulfid, thereafter treating the melt to recover the metals therefrom, performing the separation in two or more stages in cascade the fused melt passing in one direction and the solid residue being moved in the other direction, washing rapidly the residue with hot water to remove soluble chlorids such as zinc and lead chlorids therefrom, and adding the solution of chlorids to the melt.

10. The herein described process of separating lead and other metals from zinc sulfid containing lead and other metallic sulfids which consists in the reaction of zinc chlorid with said metallic sulfids in the fused state to precipitate zinc sulfid and dissolve lead and other metals, pouring off the melt from the residue to separate the liquid melt consisting of zinc chlorid having in solution chlorids of the other metals from the solid residual zinc sulfid, thereafter treating the melt to recover the metals therefrom, performing the separation in two or more stages in cascade the fused melt passing in one direction and the solid residue being moved in the other direction, washing rapidly the residue with hot water to remove soluble chlorids such as zinc and lead chlorids therefrom and adding the solution of chlorids to the melt, and introducing into water the separated melt containing zinc chlorid and other metal chlorids such as lead chlorid and also some finely divided zinc sulfid in suspension so that the zinc sulfid and lead chlorid react to precipitate lead compounds.

11. The herein described process of separating lead and other metals from zinc sulfid containing lead and other metallic sulfids which consists in the reaction of zinc chlorid with said metallic sulfids in the fused state to precipitate zinc sulfid and dissolve lead and other metals, pouring off the liquid melt consisting of zinc chlorid having in solution chlorids of the other metals from the solid residue to separate the melt from the residual zinc sulfid, thereafter treating the melt to recover the metals therefrom, performing the separation in two or more stages in cascade the fused melt passing in one direction and the solid residue being moved in the other direction, washing rapidly the residue with hot water to remove soluble chlorids such as zinc and lead chlorids therefrom and adding the solution of chlorids to the melt, and introducing into water, with the addition of acid, the separated melt containing zinc chlorid and other metal chlorids such as lead chlorid and also some finely divided zinc sulfid in suspension so that the zinc sulfid and lead chlorid react to precipitate lead compounds.

12. The herein described process of separating lead and other metals from zinc sulfid containing lead and other metallic sulfids which consists in the reaction of zinc chlorid with said metallic sulfids in the fused state to precipitate zinc sulfid and dissolve lead and other metals, pouring off the liquid melt consisting of zinc chlorid having in solution chlorids of the other metals from the solid residue to separate the melt from the residual zinc sulfid, thereafter treating the melt to recover the metals therefrom, performing the separation in two or more stages in cascade the fused melt passing in one direction and the solid residue being moved in the other direction, and in adding the fused zinc chlorid in considerable excess in the form of a mixture of zinc and sodium chlorids in molecular proportions corresponding to the formula $ZnNa_2Cl_4$.

13. The herein described process of separating lead and other metals from zinc sulfid containing lead and other metallic sulfids which consists in the reaction of zinc chlorid with said metallic sulfids in the fused state to precipitate zinc sulfid and dissolve lead and other metals, pouring off the melt from the residue to separate the liquid melt consisting of zinc chlorid having in solution chlorids of the other metals from the solid residual zinc sulfid, thereafter treating the melt to recover the metals therefrom, performing the separation in two or more stages in cascade the fused melt passing in one direction and the solid residue being moved in the other direction, and in performing the operation over a bath of molten lead so that any silver contained in the original mixture will be precipitated therein.

14. The herein described process of separating lead and other metal sulfids from zinc sulfid containing lead antimony and other metallic sulfids which consists in the reaction of zinc chlorid with said metallic sulfids in the fused state to precipitate zinc sulfid and dissolve lead and other metals, in pouring off the liquid melt consisting of zinc chlorid having in solution chlorids of the other metals from the solid residue to separate the melt from the residual zinc sulfid, thereafter treating the melt to recover the metals therefrom, performing the separation in two or more stages in cascade the fused melt passing in one direction and the solid residue being moved in the other direction, distilling chlorid of antimony from the receptacle in which the operation takes place, recovering said chlorid, and treating with zinc oxid for the regeneration of zinc chlorid forming oxid of antimony.

In testimony whereof I have signed my name to this specification in the presence of two subscribing witnesses.

EDGAR ARTHUR ASHCROFT.

Witnesses:
HARRY B. BRIDGE,
PERCY HEWITT.